United States Patent
Holy

[15] 3,700,221
[45] Oct. 24, 1972

[54] CYCLONE KILN SYSTEM

[72] Inventor: Vladislav Holy, Praha, Czechoslovakia

[73] Assignee: Vyzkumny ustav Kovu, Paneneske Brezany, Czechoslovakia

[22] Filed: Dec. 23, 1969

[21] Appl. No.: 887,607

[30] Foreign Application Priority Data

Dec. 27, 1968 Czechoslovakia..........880868

[52] U.S. Cl. ..............................266/9, 75/89, 266/15
[51] Int. Cl. ................................................C22b 5/00
[58] Field of Search............75/38, 39, 40, 62, 73, 74, 75/89, 91; 266/9, 10, 11, 15, 24

[56] References Cited

UNITED STATES PATENTS

| | | | |
|---|---|---|---|
| 2,368,508 | 1/1945 | Wile | 266/11 |
| 2,503,555 | 4/1950 | Lykken | 75/38 |
| 3,145,094 | 8/1964 | Nakajima | 266/9 |
| 2,928,730 | 3/1960 | Luerssen | 75/38 |
| 817,414 | 4/1906 | Brown | 266/10 |
| 1,284,094 | 11/1918 | Grouselle | 75/38 |
| 2,894,831 | 7/1959 | Old et al. | 266/24 |
| 2,784,076 | 3/1957 | Greenawalt | 75/74 |

*Primary Examiner*—Gerald A. Dost
*Attorney*—Arthur O. Klein

[57] ABSTRACT

A cyclone kiln system for heat treatment of ores and concentrates of non-ferrous metals for separating said metals, provided between the cyclone reactor and the settling oven for slag and stone a distribution chamber with cooled walls, preventing an early decay of the lining of the settling oven.

1 Claim, 2 Drawing Figures

PATENTED OCT 24 1972 3,700,221

INVENTOR
Vladislav Holy
BY Arthur O. Klein
ATTORNEY

CYCLONE KILN SYSTEM

BACKGROUND OF THE INVENTION

This invention relates to a cyclone kiln system for metallurgic heat treatment of ores and concentrates of non-ferrous metals and of other material.

Actually used cyclone kiln used in non-ferrous metallurgy are provided with a cyclone reactor, where the treated material is molten with the addition of fuel. The reactor is usually situated on the top of a ceramic settling oven, into which the combustion products and the molten material are discharged. The molten material is collected in the settling oven, where the stone and the slag are separated by settling and are periodically tapped, whereas the combustion products with the evaporated metals are supplied from the settling oven into a cooling system composed generally of a water cooler and of an air preheater wherefrom they enter a filter composed of fabric or an electrostatic separator, where the originally evaporated metals are retained mostly in the shape of oxides.

These arrangements have a number of drawbacks. The main drawback is a limited life time of the lining of the settling oven which is subject to effective erosion, as the combustion products rotating intensively, show an exceptionally strong aggressive effect which has to be withstood by the lining. A further drawback is that the combustion products which rotate intensively maintain also the molten material collected in the settling oven in rotation and prevent thus an effective separation of the slag from the stone, resulting in high losses of metals into the slag. The yield of metals from the stone is thus substantially reduced.

SUMMARY OF THE INVENTION

It is an object of this invention to provide a cyclone kiln system for metallurgic heat treatment of ores and concentrates of non-ferrous metals and other material which would to a substantial degree eliminate the limited life time of the settling oven of actual cyclone kiln systems.

It is another object of this invention to provide a cyclone kiln system for the said purpose with an improved yield of non-ferrous metals.

Bearing these and other objects of this invention in mind a cyclone kiln system is provided, having a distribution chamber between the cyclone reactor and a settling oven, the cyclone reactor situated on top of the distribution chamber, the walls of which are cooled by a cooling medium, the material treated in the cyclone reactor being discharged into the distribution chamber, provided with an outlet in its bottom part for the slag and stone terminating into the settling oven provided with additional heating means and with a second outlet from the distribution chamber for the gaseous fraction terminating into cooling and separating means for the yielded products.

DESCRIPTION OF PREFERRED EMBODIMENTS

Figure 1:
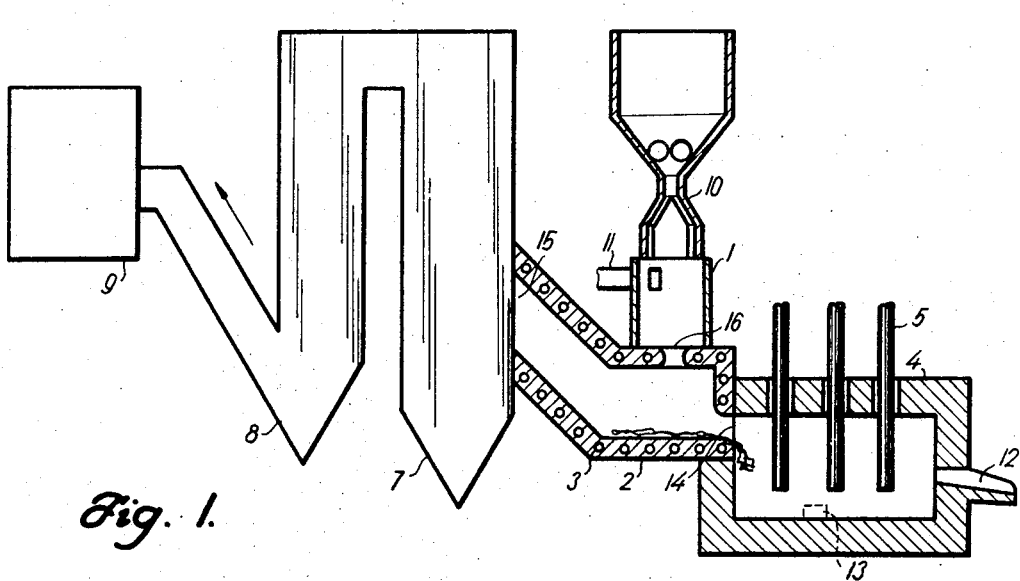
FIG. 1 of the accompanying drawing shows a schematic outline of one embodiment of the cyclone kiln system according to this invention.

In FIG. 1 there is a cyclone reactor 1 situated on the top wall of a distribution chamber 2. The charge is introduced into the cyclone reactor 1 over the inlet 10, the combustion air enters the reactor 1 tangentially over the inlet 11. Cooling conduits 3 for a cooling medium, for instance water are provided in the walls of the distribution chamber 2. The bottom outlet 16 from the cyclone reactor 1 terminates into this distribution chamber 2. A settling oven 4 is connected with the bottom part of the distribution chamber 2 by way of a bottom outlet 14. The settling oven 4 is provided with electrodes 5 for additional electric heating. Another outlet 15 of the distribution chamber 2 terminates into a cooler 7, a preheater 8 for air and an electrostatic separator 9 or filter.

Figure 2:
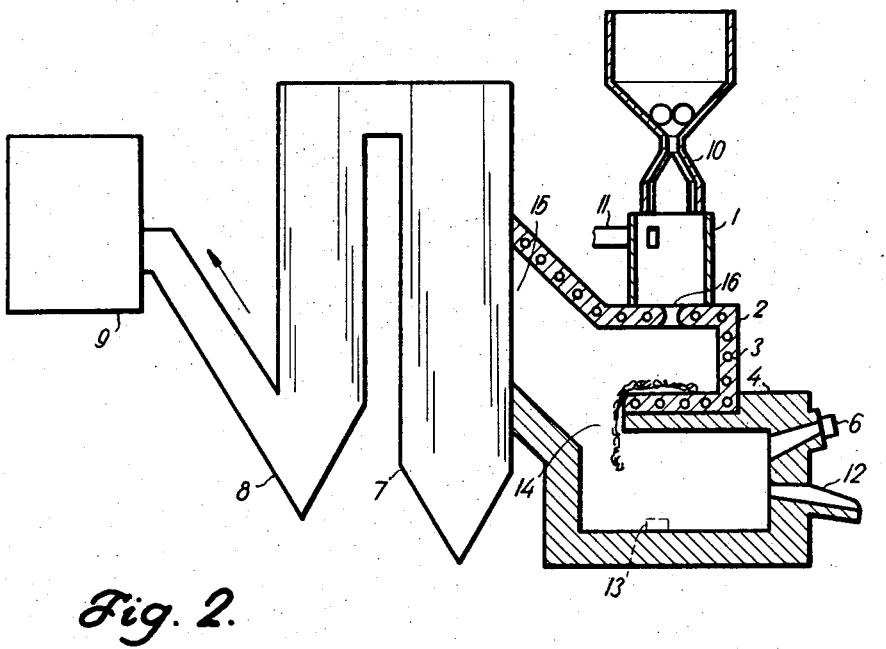
FIG. 2 is a similar view of an alternative arrangement.

The arrangement according to FIG. 2 differs from that in FIG. 1 in that the settling oven 4 is situated directly below the distribution chamber 2 and is heated by oil burners 6.

Treated material is supplied together with a solid, liquid or gaseous fuel and combustion air tangentially into the cyclone reactor 1, where an effective burning takes place and all combustion products together with the gaseous fraction are discharged through the bottom opening 16 of the cyclone reactor 1 into the distribution chamber 2, where they enter with still substantial rotating speed. The hot liquid products settle at the bottom of the distribution chamber 2 and flow by way of a bottom opening 14 into the settling oven 4, which is additionally heated electrically or by burners 6, and is maintained at a temperature suitable for effective separation of the slag from the stone. Both slag and stone are intermittently tapped by way of a openings 12 and 13 respectively at proper levels.

The gaseous fraction including the evaporated metal passes from the distribution chamber 2 by way of the outlet 15 into a cooler 7 with an adjacent preheater 8 of the combustion air and enters finally the separator 9 where the metal is retained mostly in the shape of oxides.

As the walls of the distribution chamber 2 are effectively cooled by water or some other medium, a protective layer is formed on the internal surface of the lining of this chamber, which protects the lining from corrosion and from other aggressive effects of the in coming material, so that the problems connected with linings are eliminated, which problems are rather difficult to solve at actual systems, where these products enter at elevated speed the settling oven.

In operation, the treated material is supplied together with fuel and combustion on air preheated to about 400° to 500° C tangentially into the cyclone reactor 1, where an intensive burning process proceeds raising the temperature in the cyclone reactor to some 1,400° to 1,700° C. The material passes within the cyclone reactor a spiral track with a resulting melting of parts of the material and gasifying of the metals contained in the supplied material. The combustion products with the molten material which have still a considerable rotating speed enter by way of a bottom opening of the cyclobe reactor 1 the distribution chamber 2, where the molten products remain at its bottom and pass over into the settling oven 4 maintained by additional heating means at a proper temperature.

As the molten material flows from the distribution chamber 2 into the settling oven 4 where it is collected and the combustion products with the evaporated metal enter the cooling and separating means, the distribution chamber 2 fulfills solely the task of a separating space and not of a collecting space for the molten material. The distribution chamber 2 is therefore relatively small, its diameter may be about twice the diameter of the cyclone reactor 1 and its height about 1.5 times the height of the reactor. Its lining does not suffer in the course of operation as the walls are cooled, enabling an uninterrupted operation for a considerable time without danger of a decrease of the thickness of the lining.

An effective separation of the slag and of the stone takes place in the settling oven 4 as there are here no influences of streaming combustion products from the cyclone reactor 1. The yield of different metals from the stone is thus substantially improved as the losses into the slag are reduced.

The arrangement according to this invention is particularly suitable for separation of metals as tin, quicksilver, arsen, antimon, lead, bismuth, zinc and similar. In practical tests with material containing tin, a yield of 90 percent of tin has been obtained, mostly in the shape of oxides. The yield of tin can be further improved to about 95 percent by an addition of about 5 percent of charcoal or of 10 percent of stone coal. It has been furthermore shown to be advantagesous to add about 10 to 20 percent of burnt lime, which reduces the viscosity of the slag.

I claim:

1. A cyclone kiln system for metallurgic heat treatment of ores and concentrates of non-ferrous metals and other material comprising in combination:
   a cyclone reactor,
   a settling oven,
   a distribution chamber,
   cooling and separating means for the gaseous products of the cyclone reactor,
   means for supplying into the cyclone reactor tangentially a stream of combustion air entraining the material to be treated and the fuel,
   the cyclone reactor being situated above the distribution chamber,
   an outlet of the cyclone reactor terminating into the distribution chamber,
   means for cooling the walls of the distribution chamber,
   a first outlet in the bottom part of the distribution chamber terminating in the settling oven,
   a second outlet of the distribution chamber terminating into the cooling and separating means for the gaseous products of the cyclone reactor,
   means for additionally heating the settling oven, and
   means for tapping slag and stone from the settling oven.

* * * * *